(12) United States Patent
Osborn et al.

(10) Patent No.: US 7,255,332 B2
(45) Date of Patent: Aug. 14, 2007

(54) SYSTEM AND METHOD FOR DISSOLVING GASES IN LIQUIDS

(75) Inventors: Gregory Scott Osborn, Fayetteville, AR (US); Marty D. Matlock, Fayetteville, AR (US); Shandi S. Teltschik, Minot AFB, ND (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 35 days.

(21) Appl. No.: 11/137,856

(22) Filed: May 25, 2005

(65) Prior Publication Data

US 2005/0279713 A1 Dec. 22, 2005

Related U.S. Application Data

(60) Provisional application No. 60/574,152, filed on May 25, 2004.

(51) Int. Cl.
*B01F 3/04* (2006.01)
(52) U.S. Cl. .............. 261/28; 261/37; 261/77; 261/115; 261/124; 210/760; 210/221.2
(58) Field of Classification Search ............ 261/28, 261/37, 77, 78.2, 115, 119.1, 124, 122.1; 210/221.2, 760
See application file for complete search history.

(56) References Cited

U.S. PATENT DOCUMENTS

| | | | |
|---|---|---|---|
| 3,643,403 A | 2/1972 | Speece | |
| 3,932,282 A | 1/1976 | Ettelt | |
| 3,960,066 A * | 6/1976 | LaRocco et al. | ............ 99/323.2 |
| 4,163,712 A * | 8/1979 | Smith | .......... 210/622 |
| 4,317,731 A | 3/1982 | Roberts, Jr. et al. | |
| 4,501,664 A | 2/1985 | Heil et al. | |
| 4,981,582 A * | 1/1991 | Yoon et al. | .......... 209/164 |
| 5,275,742 A | 1/1994 | Satchell, Jr. et al. | |
| 5,382,358 A | 1/1995 | Yeh | |
| 5,451,349 A | 9/1995 | Kingsley | |
| 5,647,977 A | 7/1997 | Arnaud | |
| 5,674,312 A | 10/1997 | Mazzei | |
| 5,766,484 A | 6/1998 | Petit et al. | |
| 5,865,995 A | 2/1999 | Nelson | |
| 5,885,467 A | 3/1999 | Zelenak et al. | |
| 5,904,851 A | 5/1999 | Taylor et al. | |
| 5,911,870 A | 6/1999 | Hough | |
| 5,979,363 A | 11/1999 | Shaar | |

(Continued)

*Primary Examiner*—Scott Bushey
(74) *Attorney, Agent, or Firm*—Medicus Associates; James H. Meadows

(57) ABSTRACT

Apparatus and methods for dissolving a gas into a liquid comprises a saturation tank, a high pressure liquid pump in fluid communication with the tank, and a pressurized gas source in communication with a regulated gas head space of the saturation tank. The saturation tank comprises a pressure vessel for containing the liquid and has a regulated gas head space above the liquid, contains at least one liquid spray nozzle that permits passage of liquid into the pressure vessel, and an outlet for the liquid containing dissolved gas. Upon passing the gas-containing liquid into a second fluid, the gas is released in the form of microbubbles. The microbubbles aid in flocculation of suspended particles and promote dissolution of the gas in the second fluid. Preferred gases for use with the apparatus are oxygen, air, and ozone. Anticipated uses include treatment of rivers, streams, and ponds in natural or industrial settings, as well as smaller scale applications.

12 Claims, 5 Drawing Sheets

U.S. PATENT DOCUMENTS

| | | |
|---|---|---|
| 6,076,808 A | 6/2000 | Porter |
| 6,090,294 A | 7/2000 | Teran |
| 6,193,893 B1 | 2/2001 | Mazzei et al. |
| 6,279,882 B1 | 8/2001 | Littman |
| 6,474,627 B2 | 11/2002 | Speece |
| 6,485,003 B2 | 11/2002 | Speece |
| 6,503,403 B2 | 1/2003 | Green et al. |
| 6,730,214 B2 | 5/2004 | Mazzei |
| 6,840,983 B2 | 1/2005 | McNulty |
| 6,848,258 B1 | 2/2005 | Speece |
| 6,877,726 B1 * | 4/2005 | Rindt et al. .................. 261/111 |
| 6,962,654 B2 | 11/2005 | Arnaud |
| 2003/0071372 A1 * | 4/2003 | Scherzinger et al. .......... 261/76 |
| 2003/0183584 A1 * | 10/2003 | Galatro et al. .............. 210/760 |

* cited by examiner

SYSTEM AND METHOD FOR DISSOLVING GASES IN LIQUIDS

REFERENCE TO RELATED APPLICATION

This application claims the benefit of U.S. Provisional Application No. 60/574,152, filed May 25, 2004, the disclosure of which is incorporated herein by reference.

STATEMENT OF GOVERNMENT SUPPORT

The present invention has been supported at least in part by U.S. SeaGrant Agency No. 502048. Further development of the technology has been supported by the National Science Foundation SBIR program, Grant No. DMI-0419555. The Government may have certain rights in the invention.

FIELD OF THE INVENTION

The present invention relates to methods and apparatus for dissolving gases in liquids. The invention particularly relates to oxygenation and ozonation of municipal, industrial, residential and environmental water supplies, bulk gas exchange and control in industrial and biotechnological processes, and applications to manufacturing, distribution and control of nanoparticles and related technologies.

BACKGROUND OF THE INVENTION

Many different systems and methods, depending on application, are available for dissolving gases in liquids. Some of the main applications are for the oxygenation of outdoor water bodies, industrial uses, and the treatment of wastewater.

The aeration/oxygenation of water in outdoor settings is necessary for the remediation of local environments subjected to high oxygen demand loads. Typical devices used to oxygenate water bodies are based on entraining atmospheric air into the top surface layer through fountains or paddle-type rotating wheels; or submersion entrainment with diffusers or bubble aerators that pump air to the bottom of the water body and allow bubbles to rise to the surface. Drop structures that create waterfalls also employ the same process of entrainment. These devices are typically operated continuously and are permanently installed equipment with high capital costs.

Many devices also exist for oxygenating water in an industrial setting such as vortex entrainment technology and equipment from several different manufacturers, including Air Products (Allentown, Pa.) and Air Liquide (Paris, France), but this type of equipment is usually not appropriate for field use because of high capital costs and the inability to operate continuously in outdoor conditions at remote locations. These devices are also typically not appropriate for high particulate water because of sensitivity to clogging.

Most of the current products and techniques for oxygenation of water were developed for large-scale wastewater treatment. The required equipment is usually permanently installed, installation is time-intensive, and there are high capital and start-up costs. Because most of the products available for oxygenation are not portable, the flexibility of their applications is quite limited. Wastewater treatment plants use two basic methods to aerate wastewater: entrainment or air via diffusers or other aeration devices; and, mechanical agitation to entrain air from the atmosphere into the water.

Entrainment diffusers create air bubbles by pumping air directly into the liquid phase through diffusers or some other type of device. The most widely used diffusers are classified as either porous or fine pore (nonporous). Porous diffusers incorporate porous ceramic tubing/plate through which air passes, creating very small bubbles that aerate the water. Diffusers that are classified as nonporous use perforated piping or tubing for introducing air to water. Other types of diffusers include jet aerators, aspirators, and U-tube aerators.

Mechanical aerators usually employ impellors and may be fixed or float-mounted. They may be classified as high-speed axial-flow pump type, slow-speed vertical turbine, submerged slow-speed turbine with sparger ring, and rotating brush. In pump-type aerators, which are used primarily in aeration lagoons, oxygen is transferred as the spray passes through the air and the area where turbulence is created around the impellors. The slow-speed vertical turbine blades, used for activated sludge, aerobic digesters, and aerated lagoons, are submerged a few inches below the water surface where air entrapment occurs in the vicinity of the turbine. Compressed air is released below the turbine with the submerged slow-speed vertical turbine with sparger ring to create oxygen transfer. Finally, the rotating brush, used mainly in oxidation ditches, is a long horizontal axle with radiating steel bristles that are partly submerged. Air transfer occurs in the immediate vicinity of the bristles.

Another type of aeration treatment technique is a stabilization pond (or oxidation pond), which is a relatively shallow body of wastewater contained in an earthen basin and used for secondary treatment of settled wastewater. Oxygen is introduced through wind mixing, mechanical aerators, or photosynthetic processes. In the stabilization pond, organic matter is stabilized through the combined action of algae and other microorganisms. Algae produce oxygen while growing in the presence of sunlight. This resultant oxygen is then used by other microbes for oxidizing organic matter, which in turn results in carbon dioxide, ammonia, and phosphates as end products. These end-products are required by algae for growth, resulting in a cyclical process and stabilization because of these combined processes. Stabilization ponds are classified as aerobic, facultative (aerobic-anaerobic), and anaerobic. An aerated lagoon is similar to an aerobic pond, but it is usually deeper, and oxygen is introduced via mechanical aerators rather than photosynthetic oxygen production.

Another process that can add oxygen to water is Dissolved Air Flotation (DAF), which was initially designed for solids flotation. In DAF, an enclosed container of water and air are compressed, thereby dissolving the air into the water. The pressure on the batch is then suddenly released and the air comes out of solution. Microbubbles are formed that attach to solids and nutrients in the water and float them to the surface. DAF is usually a batch process within settling and skimming tanks. Although not usually considered a method for oxygenation, DAF may be useful as an oxygenation technique.

Air flotation involves forming bubbles by introducing the gas phase directly into the liquid through impellers or diffusers. A DAF system undergoes the following processes: The influent is mixed with coagulants to cause flocculation or the formation of larger particles. This usually includes a rapid redox shift using ferric chloride or similar reducing agents, often with acrylic acid to enhance flocculation of fine solids. A recycle stream of effluent water is pressurized and saturated with air in the saturation tank, then added to the flocculated influent. This mixture is then released into the contact zone where the microbubbles (<100-120 μm) come out of solution under the lower pressure and attach to the flocculants, forming bubble-floc agglomerates. These agglomerates then leave the contact zone and rise to the surface of the flotation tank, forming a floating sludge layer on the surface of the water. This sludge is then removed by a mechanical surface scraper.

Most dissolved air flotation systems consist of similar components and can include coagulant mixing for flocculation, a saturated recycle stream, a contact zone, and a flotation tank. Others use a pilot plant with a static mixer, flocculation chamber, flotation chamber, saturator with recycle stream, and a filter column. Early stage DAF plants usually consist of a chemical coagulation area, flocculator, flotation tank, saturator, and a recycle stream.

Methods of gas saturation in a liquid include sparging air into the water in a pressure vessel, trickling the water over a packed bed, spraying the water into an unpacked saturator, entraining air with ejectors, and injecting air into the suction pipe of the recycle pump. Typical saturators are operated between 50 to 85 psig with bubble size decreasing as saturator pressure increases. Also, the retention time will increase as bubble size decreases. It is found that smaller bubbles result in a slower rise velocity as well as a smaller contact angle between bubble and particle, therefore increasing the possibility of collision between particle and bubble.

Discussion of Patent References

U.S. Pat. No. 5,979,363 (issued to Shaar) describes an aquaculture system that involves piping a food and oxygen slurry into a pond. U.S. Pat. No. 5,911,870 (issued to Hough) proposes a device for increasing the quantity of dissolved oxygen in water and employs an electrolytic cell to generate the oxygen. U.S. Pat. No. 5,904,851 (issued to Taylor et al.) proposes a method for enriching water with oxygen that employs a turbulent mixer to entrain the gas in the liquid. U.S. Pat. No. 5,885,467 (issued to Zelenak et al.) proposes mixing a liquid with oxygen using a plurality of plates or trays over which the liquid flows gradually downward. U.S. Pat. No. 4,501,664 (issued to Heil et al.) proposes a device for treating organic wastewater with dissolved oxygen that employs several process compartments. U.S. Pat. No. 5,766,484 (issued to Petit et al.) proposes a dissolved gas flotation system for treatment of wastewater wherein the relative location of inlet and outlet structures reportedly maximizes the effect of air bubbles in separating solids from the fluid. U.S. Pat. No. 5,647,977 (issued to Arnaud) proposes a system for treating wastewater that includes aeration, mixing/flocculating, and contact media for removing suspended solids, etc. U.S. Pat. No. 5,382,358 (issued to Yeh) proposes an apparatus for separation of suspended matter in a liquid by dissolved air flotation (DAF). U.S. Pat. No. 3,932,282 (issued to Ettelt) proposes a dissolved air flotation system that includes a vertical flotation column designed with an aim of preventing bubble breakage.

An object of the present invention is to provide a simplified, low cost method and apparatus for rapidly increasing the dissolved gas levels in a liquid. A further object of the invention is to provide a method of floating particles suspended in the fluid.

SUMMARY OF THE INVENTION

Apparatus and methods are disclosed for facilitating dissolution of one or more gases into a liquid, such as water. Preferred gases for use with the apparatus are oxygen, air, and ozone, and preferred applications include oxygenation and/or ozonation treatment of rivers, streams, and ponds in natural, municipal, or industrial settings.

An apparatus of the present invention comprises a saturation tank, a means of transporting the liquid into the saturation tank, and a pressurized gas source in communication with the saturation tank. The saturation tank comprises a pressure vessel for containing the liquid and affords a regulated gas head space over the liquid in the vessel. The saturation tank is preferably further provided with at least one liquid spray nozzle that permits passage of the liquid into the pressure vessel in the head space region of the tank. The saturation tank also is provided with an outlet for the liquid containing dissolved gas, which permits it to exit the tank and to pass into an external fluid having a lower partial pressure of the gas. Only the liquid exits the device—all gases are contained in the saturation tank and only exit the saturation tank dissolved in liquid. Once the supersaturated liquid is contacted with the external fluid, gas dissolved in the liquid at a higher partial pressure is released in the form of microbubbles. The microbubbles promote dissolution of the gas in the external fluid and can aid in flocculation and flotation of any suspended particles therein.

A method of dissolving a gas in a liquid comprises pressurizing an enclosed vessel with the gas, spraying a first portion of the liquid into the vessel containing the gas under conditions effective to dissolve the gas in the liquid, passing the first portion of liquid containing dissolved gas from the vessel into a chamber that is provided with a plurality of orifices and which is immersed in a second portion of the liquid, and discharging the first liquid portion containing dissolved gas into the second liquid portion under conditions effective to form microbubbles of the gas in the second liquid portion at or near the chamber orifices. Microbubbles on the order of 150 micron diameter or less (including nanobubbles) can be obtained by a method of the invention.

DETAILED DESCRIPTION OF THE INVENTION

The present invention is for methods and apparatus for dissolving a gas in a liquid. An object of the invention is to raise the concentration of a dissolved gas in a target fluid body by discharging into it a liquid having the gas dissolved therein at a higher partial pressure. To this end, a liquid is preferably prepared with the gas at or near saturation levels at a pressure higher than that of the target liquid.

Figure 1:
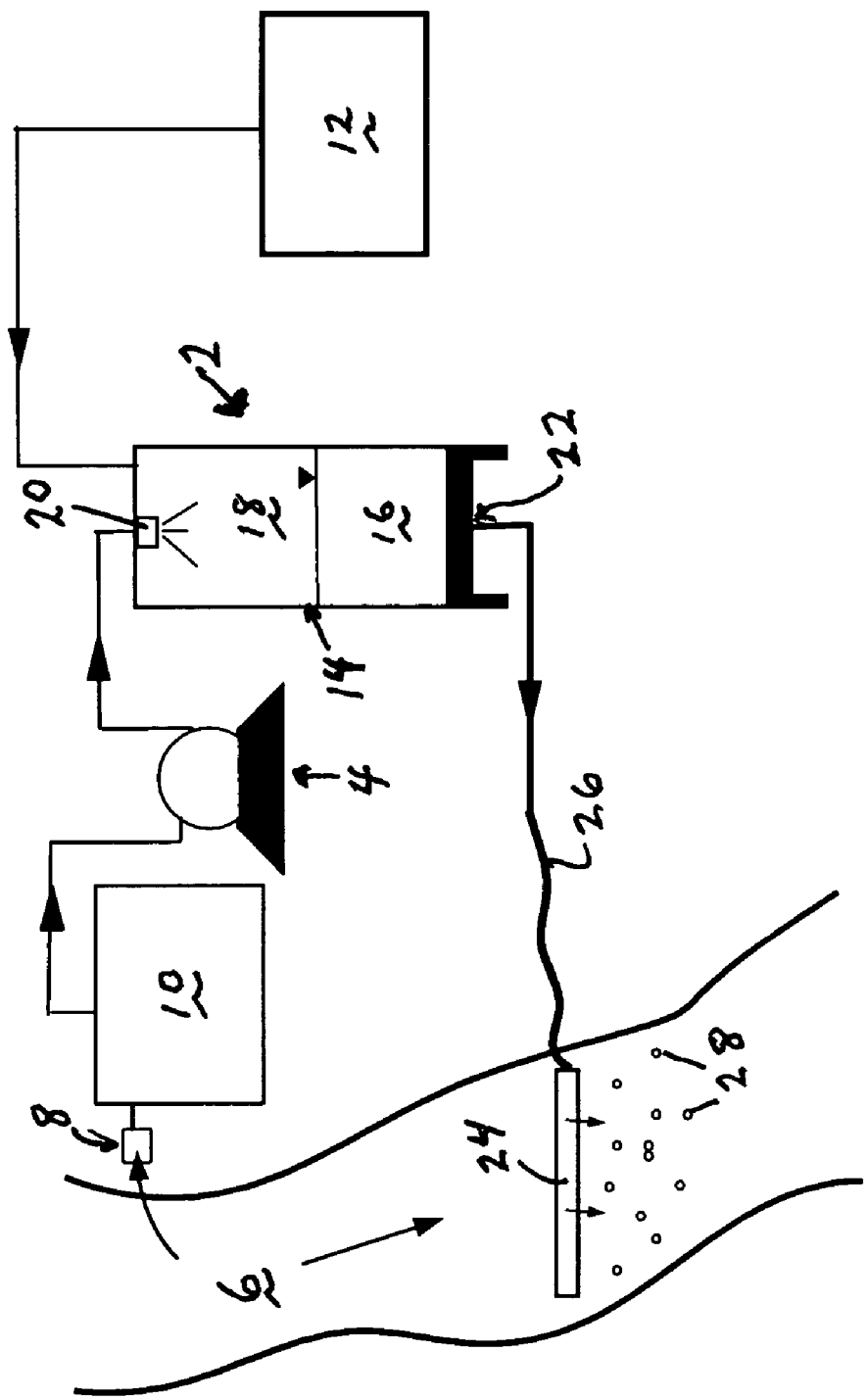
FIG. 1 shows a schematic diagram for treatment of a natural stream with a generic gas using a microbubble generation device of the present invention.

As shown in FIG. 1, one embodiment of the invention comprises saturation tank 2 and liquid pumping means 4 in fluid communication with the saturation tank. The pumping means receives liquid from stream 6 via filter 8 and supply tank 10. A source 12 of the gas is in communication with the saturation tank. Saturation tank 2 preferably comprises pressure vessel 14 for containing the liquid 16 and providing a gas head space 18 above the liquid at a super-atmospheric pressure. The saturation tank also comprises at least one liquid spray nozzle 20 that permits passage of liquid into the pressure vessel through action of pumping means 4. The saturation tank also comprises an outlet 22 in the tank that permits passage of gasified liquid into external chamber 24, through connecting means 26, where it is discharged into liquid stream 6 by passing through a plurality of orifices provided in the wall of the external chamber (not shown). Microbubbles 28 are thereby released into the stream.

Whenever the partial pressure of the gas in the target fluid is initially lower than that of the gas dissolved in the liquid coming from the saturation tank, the concentration of dissolved gas in the target fluid is increased. Preferably, the size, shape and number of orifices in the external chamber are predefined so that microbubbles of gas are formed at or near the chamber orifices, thereby enhancing dissolution of the gas in the target fluid. The gas is preferably air, oxygen, ozone, hydrogen, nitrogen, nitrous oxide, or carbon dioxide, and the liquid is typically composed primarily of water.

A pumping means of the present invention is suitably selected from among (i) a high pressure liquid pump, (ii) a line source, such as tap water, in a residential or industrial setting, or (iii) a plurality of fixed volume vessels capable of forcing liquid into the saturation tank upon pressurization of the fixed vessel with a high pressure gas that enters the vessel and displaces the liquid through an outlet in the vessel. For most outdoor applications, a high pressure pump is conveniently selected. Many commercial sources are available with the rating depending on application, as is readily apparent to the skilled practitioner.

A gas dissolution system of the present invention can be operated in batch or continuous mode. Whenever the system is operated in continuous mode, it is preferred that the ratio of liquid volume to head space gas volume in the saturation tank is maintained, which can be done using an open-loop or closed-loop control system.

A source of gas is also a component of the system and depends upon the type and amount of gas required for an application. Air can be pumped directly from the atmosphere into the saturation tank in some applications. In others, bottled oxygen, obtained cryogenically, or oxygen separated from the atmosphere on-site can be used. In such latter applications, it may be preferable to employ a non-cryogenic means for purifying oxygen from ambient air. Non-cryogenic equipment for purifying oxygen can be obtained commercially, such as from Universal Industrial Gases, Inc. (Easton, Pa.). In still other applications, ozone can be provided, typically by on-site generation of ozone from oxygen or air. Such ozone generators can be obtained commercially from Spartan Environmental Technologies, Inc. (Mentor, Ohio). The ozone generator can be installed conveniently within the saturation tank.

Liquid in the saturation tank is contacted with a gas or gases of choice for a predetermined period of time sufficient to bring liquid to or near saturation with the gas. Next, the liquid containing dissolved gas is passed into the external chamber, which is provided with a plurality of orifices. Under continuous operation, the number, size, and placement of orifices in the chamber are preferably predefined so as to permit the rate of liquid flow rate out of the chamber to balance the rate of liquid flow into the saturation tank, thereby maintaining constant pressure internal the saturation tank under constant flow conditions. Additionally, the chamber, which is conveniently tube-shaped, can be provided internal a liquid entrainment means, such as a hollow tube, so that the liquid containing dissolved gas exiting the chamber mixes thoroughly with the lower pressure target fluid. It is preferred that microbubbles generated by the system have an average diameter less than about 150 microns, and in certain applications nano-bubbles having an average diameter in the range of about 10 nm to about 100 nm are preferred.

Determination of the number, size and placement of the orifices in the chamber wall, as well as the pumping means, gas pressure in the tank, and liquid flow rate into and out of the tank, can be determined by engineering design calculation and/or on-site calibration through trial and error. Alternatively, it may be preferred to make adjustments from a known set of parameters by making considerations for viscosity, density, and surface tension of the liquid so as to optimize the ratio of gas delivered to energy consumed for a given application. Additionally, it may be desired to regulate the gas saturation threshold for the liquid by thermally controlling the saturation tank. Moreover, it may be preferred to employ adjustable spray nozzles within the saturation tank so as to optimize the liquid droplet size and control the rate of gas saturation in the liquid.

A system of the present invention can further comprise an electronic control system for controlling its operation, e.g., by controlling pump speed, gas pressure, valve operation, and the like. The apparatus can further comprise a feedback loop that permits recovery and recycling of the gas to the saturation tank.

The present invention further contemplates a novel method of dissolving a gas in a liquid. Such method comprises pressurizing an enclosed vessel with the gas, spraying a first portion of the liquid into the vessel containing the gas under conditions effective to dissolve the gas in the liquid, passing the first portion of liquid containing dissolved gas from the vessel into a chamber that is provided with a plurality of orifices and which is immersed in a second portion of the liquid, and discharging the first liquid portion containing dissolved gas into the second liquid portion under conditions effective to form microbubbles of the gas in the second liquid portion at or near the chamber orifices.

Such a method of the invention can be employed with any, or a combination, of the gases air, oxygen, ozone, hydrogen, nitrogen, nitrous oxide, and carbon dioxide. Conventionally, the liquid primarily comprises water, and may contain significant levels of suspended particles. In a method of dissolution, the portion of the liquid at high pressure within the saturation tank is preferably dissolved with gas to 95% or greater of saturation, resulting in supersaturation (2000% or greater of saturation) of the liquid after discharge to near atmospheric pressure conditions. Accordingly, whenever the gas-containing liquid is discharged into the second portion of liquid, microbubbles having an average diameter less than about 150 microns are formed and released into the fluid. Typically, the gas employed is air or oxygen, and the liquid to be gasified is water in a natural or wastewater setting. An oxygen source is preferably obtained by commercial cryogenic methods. In another preferred embodiment of the invention, the gas is ozone and the liquid is water to be purified for home, medical, or municipal use. The ozone can be provided by on-site generation, and preferably enters the saturation tank at or near ambient pressure, where it is pressurized via a closed system injection of liquid until a desired higher pressure is attained prior to discharge of the gas-containing liquid.

To promote intimate contact of liquid and gas, the liquid is preferably sprayed into the saturation tank under pressure provided by a high pressure liquid pump. To ensure proper tank pressure and outflow rates, fluid flow into the saturation tank from a high pressure pump is controlled via feedback from sensors indicating water capacity within the saturation tank.

Representative applications of the present technology include the following:

enhance microbe growth and respiration rate in waste water treatment, fermentation processes, food synthesis and manufacturing, or solid waste treatment;

promote physical flotation of matter suspended in the liquid;

quench anaerobic biological activity in the liquid;

produce nanobubbles (10-100 nm diameter);

foam a polymer;

create a biorefuge for attracting or sustaining fish populations;

sterilize a body of water;

facilitate surface freezing while aerating during cold weather;

to control odor, antibiotic residuals, and/or bacterial loads in sewage transport conduits;

improve the quality of water entering, transducing, or exiting a dam;

improving aerobic digestion efficiency and/or odor control in a wastewater treatment pond (lagoon);

respond to a pollutant spill into an environmental water body; isolate and/or treat a plume of pollution;

disinfect and reduce organic carbon in drinking water;

control aerobic and anaerobic conditions in biological processes associated with pharmaceuticals and biotechnology;

deliver hydrogen or other gases to create and control aerobic and anaerobic conditions in biological processes associated with in situ waste treatment in groundwater;

deliver hydrogen or other gases to create and control aerobic and anaerobic conditions in biological processes associated with in situ waste treatment in surface waters;

deliver a high concentration of dissolved oxygen to enhance biological oxidation of organic carbon and nitrogen removal within wastewater treatment facilities;

oxidize sediment in situ for enhanced bioremediation of contaminants sorbed to and associated with river, lake, and estuarine sediments;

enhance oxygen treatment of refractory pollutants such as antibiotic residuals, endocrine disruptors, pesticides, and similar chemicals;

enhance ozone treatment of refractory pollutants such as antibiotic residuals, endocrine disruptors, pesticides, and similar chemicals;

inject supersaturated stream of oxygen, ozone, hydrogen or other gases for direct treatment or enhancing treatment of groundwater to remove pollutants;

increase the rate of BOD removal because of improved treatment rate from smaller bubble size; and increase the thickness of the aerobic layer in sediment for increase storage capacity of phosphorus or other water pollutants.

I: Aeration and Oxygenation of Water

A principal aspect of the present invention is a new approach for effectively and efficiently dissolving gases into a water/wastewater matrix. The primary reason for dissolving gases like air and oxygen into liquids like water is to increase the rates of biologically-mediated processes such as organic waste assimilation, biochemical process control, and ecosystem respiration.

In a major aspect of the invention, oxygen ($O_2$) is provided to aquatic ecosystems at the molecular and microbubble level, thereby enhancing hydrolysis, microbial metabolism, and oxidation. This system provides an environmentally benign alternative for in situ treatment of organics, phosphorus, and anaerobic byproducts (ammonia, methane, hydrogen sulfide). The ability to add oxygen to a water body can lead to improved ecosystem health, increased aesthetic value of the water system, increased rate of natural pollutant removal, and increased assimilation capacity, which means increasing the organic and phosphorus loads a water body can receive. Specifically, this technology can provide an in situ (or on site) intervention for remediating many important sources of water pollution.

In another aspect of the invention, ozone ($O_3$) is provided to water bodies to oxidize biological and chemical pollutants to render the water safe for human contact and consumption.

The present invention is based on the principle that the amount of gas that can be dissolved into water depends upon an equilibrium solubility, which increases as the partial pressure of the gas in contact with the water increases. By increasing the partial pressure of the gas to high levels, the amount of gas dissolved into the water dramatically increases. The invention uses this principle to create a carrier stream of water that contains high concentrations of gas that is supersaturated in the water at standard atmospheric pressure. The carrier stream is then injected at the site where the oxygen/ozone/gas is needed. The carrier stream of supersaturated water is decompressed as it moves from inside the device to outside at the point of treatment. This decompression results in the equilibrium solubility of the gas in the carrier stream being reduced which results in the gas exiting solution as very small bubbles (microbubbles). The microbubbles are then distributed throughout the system into which the carrier stream has been injected where they quickly redissolve. The carrier stream can deliver concentrations on the order of 245 ppm oxygen to waters requiring 7 ppm oxygen, therefore, a relatively small amount of water is required to deliver gas to a larger amount of fluid. In some applications, the fluid being treated can be continually circulated through the device so there is no net addition of water to the system. The behavior of the microbubbles after injection into the system is a function of the properties of the system—in systems with low gas concentration, they quickly redissolve, whereas in systems that are saturated, they largely remain formed as microbubbles.

The advantage of using pressure to dissolve gas into a carrier stream of liquid is that the dissolution process is conducted within the device under favorable conditions for fast and efficient dissolution as opposed to most technologies that conduct dissolution at the point of treatment. Another advantage is that the high pressure in the device creates very high gas concentrations resulting in very high gradients between the carrier stream and the fluid being treated. Many oxygenation/aeration/ozonation processes are limited by the diffusion rate of the gas to the fluid being treated. Diffusion rate is controlled by dissolved gas concentration gradient between the injection site and water requiring the gas. As the gradient increases, so to does the diffusion rate. This results in faster delivery of dissolved gas to the site where it is required.

Use of high pressure to dissolve gas into water would appear more expensive than dissolving gas into water at low pressure because energy must be added to compress the gas and fluid to the high pressure. However, high pressure dissolution results in much more gas being dissolved into the water such that the high pressure system can be more cost-effective on the basis of rate of dissolved gas delivered per cost of energy.

By using a carrier stream of water to deliver the dissolved gas, much more precise control of dissolved gas delivery rate can be realized as the amount of gas dissolved into the carrier stream at a constant pressure is very consistent and controllable as there are constant physical mechanisms controlling the rate and amount of gas in the carrier stream. The rate of dissolved gas being delivered is directly controlled by controlling water delivery rate, which can be very accurately controlled.

For instance, for a 50 gallon capacity saturation tank, an inlet liquid flow rate of 32 gallons per minute through one spray nozzle and an inlet oxygen flow rate of 1.36 scfm charge the liquid carrier stream to 95% saturation at 110 psi saturation tank pressure, which corresponds to 3774% of saturation at standard atmospheric pressure under continuous flow operation conditions, where the exit flow rate of oxygen-containing liquid is 32 gallons per minute and the rate of oxygen delivery to the target water is 32 grams per minute of water with a concentration of 260 mg oxygen per liter of water.

It is preferred also that the exit flow rate of liquid from the external chamber matches the flow rate into the saturation tank, in which case the total cross-sectional area of the orifices in the chamber coupled with the flow rate of water entering the saturation chamber results in a pressure loss across the orifices equal to the desired pressure in the saturation tank. Preferred orifice diameters are in the range of 1 mm to 15 mm in order to ensure that the gas does not prematurely emerge from solution, allowing the formation of microbubbles in the target water. Orifice size also controls exit water velocity, direction and mixing characteristics between the carrier stream of supersaturated water and target water being treated. Such a system can be scaled as desired for a given application, which is readily within the capability of the skilled practitioner.

Depending upon the rate of dissolved gas that must be delivered, the device is relatively small and portable and can therefore be used at remote locations outdoors. Its portability allows the device to be able to treat many different locations without a permanently fixed installation. Larger demands can be delivered using skid-mounted, truck-mounted, or floor-mounted systems.

The device not only delivers water saturated with gas, but also provides the added benefit of microbubbles of the dissolved gas as it comes out of solution once injected into the water. Microbubbles can attach directly to particulate matter in the water. These particles include organic matter and the bacteria that are typically the source of oxygen consumption and responsible high oxygen demand. Thus, the device provides the additional benefit of allowing directed aeration/oxygenation/ozonation within the fluid being treated. Microbubbles are far more effective than larger size bubbles used in standard bubble aeration technology because the high surface area-to-volume ratio of microbubbles results in fast redissolution of the gas into the water being treated. This rapid re-dissolution allows the gas to dissolve into the water before the bubbles have time to rise through and exit the water column from buoyancy forces, as with other bubble aeration/oxygenation/ozonation systems. Gas that rises through and exits the water column is not delivered to where it is needed, resulting in decreased efficiency, increased costs and increased hazardous conditions (particularly for ozone which can be toxic at a relatively low concentration).

The present invention can provide supersaturated water into a body of saturated water. This ability allows the device to provide conditions and the means for producing nanobubbles (10-100 nanometers diameter) where gas is released at the molecular level into a fluid that cannot absorb any additional gas. The high shearing action of the carrier stream release through the orifice tube opening coupled with injection of supersaturated water can produce nanobubbles for applications in manufacturing, distribution and control of nanoparticles and related technologies.

Upon leaving the external chamber, supersaturated gas comes out of solution in the form of microbubbles that rise much more slowly through the water column than larger bubbles from entrainment aeration. The size of the orifices, number of orifices per length of tube, and total length of the chamber, e.g., diffuser tube, are important considerations, because they can provide flow control for the saturator tank. The smaller, slow-rising bubbles generated by the system allow more retention time in the water column and increase the reach of the oxygen plume downstream from the treatment site in flowing streams. Microbubbles also have high surface to volume ratios that increases the oxygen transfer rate to the water column. The diameter of the microbubbles can be controlled by controlling the saturation tank pressure, orifice size and location, and the gas mixture.

In a typical use, water is pumped from a locally available source, e.g., from a stream or water body to be treated, or tap source, and screened to remove any objects that could damage the device. The inlet water is either pressurized by passing through a high pressure pump, e.g., a pressure increase on the order of 200 psi across pump with a flow rate dependant upon the rate of dissolved gas required, or by other means such as water tower or tap pressure. The pressurized water then passes through a high pressure hose and into the top of the saturation tank. Preferably, the water passes through one or more spray nozzles at the top of the tank and exits the nozzle(s) in mist form into the gas headspace inside the tank. Water flow can be either continuous or intermittent.

In a convenient mode of operations, the saturation tank includes a liquid layer filling the bottom 75% of the tank and a gaseous headspace above the liquid layer in the top 25% of the tank. The gas (air, oxygen, or others) reaches the saturation tank by being released from a pressurized vessel (air compressor, bottled gases) or production device (generators, filtration units) and flows through a gas-only pressure hose into the top of the saturation tank. The saturation chamber is typically a stainless steel welded tank cylindrical in shape (0.5 m diameter, 1.5 m height) oriented perpendicular to the ground with spherical top and bottom end pieces. Sealed input and output ports are connected to the top and bottom end pieces. The gas is dissolved into the water within the saturation pressure tank by spraying the water from the high pressure pump into the headspace of gas in the top of the tank. The small water particles sprayed from the top of the tank rapidly adsorb the gas to the point of near-saturation (approximately 95%) at saturation tank pressure. Typical operating pressure within the tank is on the order of 100 psi but can be controlled to any pressure the device can produce and structurally sustain.

The water droplets fall through the gas/spray headspace to the bottom liquid region of the tank to form a seal between the inlet gas and the tank exit. Supersaturated water exits the bottom of the saturation tank through an open valve and passes through a high pressure hose until it reaches the orifice tube. The length and diameter of the pressure hose is sized to deliver the supersaturated water to the desired site in the external chamber, e.g., orifice tube, with a minimal pressure drop from pipe friction. The orifice tube is an enclosed vessel capable of maintaining a pressure equal to that in the saturation tank (such as a rigid pipe section with a welded end cap). Holes of appropriate size and location are formed into the walls of the vessel. These holes are the only egress for the supersaturated water. The orifice tube can be placed at any location where oxygenated water is needed. The tube must be anchored to a solid body if movement of the tube is not desired. The location of the holes in the orifice tube can be tailored to individual applications (e.g. the holes can force the exit jet of supersaturated water to stream to the top of the tube to avoid disturbing the sediment layer beneath the orifice tube). Also, a Venturi-type concentric external pipe can be placed around the orifice tube for entrainment of water being treated to mix with the water being ejected from the orifice tube. This allows velocity control of treatment water, improved mixing, and dilution of gas concentration in carrier stream to avoid undesired effects of high gas concentrations.

A feature of the saturation tank with a liquid water layer sealing the gas from the exit of the orifice tube requires that the gas (air, oxygen, other) must dissolve into the water before it can exit the chamber. The gas in the headspace above the water region is used to maintain the pressure within the chamber at a constant value using a pressure regulator or other control device at the outlet of the gas storage vessel. The gas that is not dissolved into the water will be maintained in the headspace so 100% efficiency of gas utilization is obtained and no gas (often expensive or potentially hazardous) is wasted.

Once the supersaturated water passes through the hole in the orifice tube, the pressure surrounding the water drops from saturation tank pressure (typically 100 psi) to ambient conditions (typically near 0 to 40 psi gauge). This sudden change in pressure dramatically reduces the saturated concentration of the gas within the water and the low pressure water cannot hold as much gas in solution at 0 psi as it could at 100 psi. This results in the gas leaving solution in the form of microbubbles. The microbubbles rise in the water column being treated because of the difference in density between the bubbles and the surrounding water. As the microbubbles rise, oxygen diffuses from the gas bubble in to the surrounding water. Hence, water that has not passed through the oxygenator and out the orifice tube is being indirectly oxygenated by the microbubbles.

The efficiency of the delivery of oxygen (or other gas) from a bubble in water to solution in the water depends upon the retention time of the bubble in the water and the diffusion length of gas within the bubble. Microbubbles are the most efficient method for delivering oxygen to water since their small size allows them to rise much more slowly through the water column (as the viscosity of the water effects smaller bubbles much more than large bubbles), thereby increasing the retention time of the bubble in the water column. Also, the smaller the bubble, the shorter the diffusion distance for gas to diffuse to the gas/liquid interface and pass into solution. Smaller bubbles also increase the surface area-to-volume ratio allowing the gas/liquid interface to dominate the transport of the bubble contents from gas to liquid phase and greatly increase the rate of dissolution.

Microbubbles can also attach to particulate matter within the water and float the particles to the top of the water column. The particulates at the surface of the water column can be more easily removed by skimming. Also, organic waste in the water column that serves as a source of food for bacteria is typically dispersed through the water column as particulates. Any source of food for bacteria is where bacteria are located since microbes will only grow and reproduce in significant numbers when nutrients are not limited.

The attached microbubble then delivers oxygen directly to the source of oxygen depletion (bacteria, fungi, or other micro-organism). Also, by floating the particles to the top of the water column, access to oxygen in the atmosphere at the top of the stream is increased. A shift from anaerobic to aerobic respiration will allow the organic matter to be consumed much more rapidly since the kinetics of bacterial respiration processes to break down organics to carbon dioxide are far more favorable to aerobic processes. These respiration processes reduce biological oxygen demand (BOD) of the water and render organic pollutants less damaging. By reducing BOD in the water column, oxygen deficits can be removed as the organic load is reduced to a sufficiently low level to allow the rate of natural oxygen replenishing processes (such as dissolving oxygen from the atmosphere) in the stream to overtake oxygen consumption rates. Therefore, by treating a water column impaired by oxygen deficits from organic loading using the present invention, the source of the problem can be removed and repeat treatments may not be required resulting in a long-term sustainable solution to the impairment.

Potential advantages of the present invention over existing technology can be summarized as follows:

1. The device is portable and can be deployed at remote locations using a standard gas-powered generator as a source of power.
2. The device can treat biologically-active water. It utilizes microbubbles that attach to particulates in the water to quench oxygen demand at the site of consumption, thus providing rapid bioremediation response.
3. The supersaturated water is released from an orifice tube that can be placed in any location within the depth of a water column and not just treat the surface (as do agitator-type aerators). This controlled flow of oxygen-saturated water can provide a curtain of aeration wherever and whenever desired.
4. The injection of water with a controlled direction and velocity does not greatly disturb the water column and sediment as can occur with entrainment devices such as gas injectors. This avoids re-suspension of dormant oxygen-consuming particulate in sediment that can actually increase oxygen uptake in the water column. Mixing requirements are also reduced as gas dissolved in the water matrix requires much less energy to distribute than mixing gas with liquids.

5. In a closed system reservoir-type water body, the microbubbles can be pulsed to provide only the amount of microbubbles required to float algae to the surface of the water column during daylight to improve photosynthetic oxygen production. At night, the rate of supplemental oxygen can be increased to make up for the dark respiration (oxygen consumption) by algae. This cycling can utilize the net oxygen production of algae as part of the overall oxygenation system in ponds or reservoirs.

6. The device adds no chemicals, catalysts, enzymes, or exogenous materials to the water being treated. Only water, oxygen, or air is added.

7. The device is scaleable so the rate of oxygen added can be increased or decreased to account for highly varying loads of nutrients. This feature also allows the device to be operated based on input from a DO sensor, allowing only the required amount of oxygen be added at the required location.

8. The device has a low capital cost because no specialized or expensive equipment is involved.

II: Ozonation of Water

Ozone is, in many respects, the ideal disinfectant. It is easily generated on-site, and unlike many other chemical disinfectants, ozone byproducts (predominantly $O_2$) have beneficial environmental effects. Ozone increases the dissolved oxygen (DO) concentration of the receiving water. It also has been shown to effectively oxidize and facilitate hydrolysis of many toxicants in water, including pesticides and trihalomethane precursors. It also has the added benefit of producing very few disinfection by-products (DBPs).

Ozone ($O_3$) is a very effective alternative to chlorination for disinfection of inactive pathogenic microorganisms. However, ozone is not broadly used in drinking water or wastewater treatment applications because of several concerns:

1. Ozone is very expensive to generate, and current ozone-water contactor technology (entrainment) is inefficient;
2. Current contactor technology (entrainment) results in off-gassing of ozone due to inefficient uptake, creating hazards for workers and requiring scrubbing to remove errant ozone; and
3. Dosage is critical but hard to control with entrainment—low dosage of ozone may not effectively inactivate some viruses, spores, and cysts;

The present invention provides for enhanced efficiency of ozone mixing with bulk liquids. The invention provides ozone to water bodies to oxidize biological and chemical pollutants to improve the effectiveness of water treatment for human contact and consumption. Water treatment for drinking water often requires chlorination to disinfect raw water. This chlorine reacts with organic carbon in the raw water entering a drinking water facility, producing disinfection by-products such as chloramines and others, which have been shown to cause cancer. With the present invention, ozone can be used to replace chlorination in the disinfection of raw water. The ability to meter, or control, the dose of ozone being delivered through metered supersaturated waters is a key innovation. The invention also provides a mechanism for more accurately dosing treatment waters for intensive mariculture and aquaculture water treatment, and for industrial disinfection.

The invention provides ozone to bulk liquids at the molecular and microbubble level, thereby enhancing hydrolysis, cell wall lysis, and oxidation. This system can also reduce off-gassing of ozone from the treated water. This system provides an efficient and safe alternative for regulatory and safety-motivated disinfection and treatment of organics. The invention can greatly improve ozonation efficiency. This, in turn, can enhance the economic viability of ozonation as a disinfectant. Specifically, this technology can provide a mechanism to ensure that all ozone generated is delivered to the bulk liquid in dissolved form, reducing the quantity (thus cost) of ozone necessary for a dose, reducing the need for off-gas collection and scrubbing, and providing dramatically enhanced dosage control.

Thus, another embodiment of the present invention as shown in FIG. 1, employs an ozone/water saturation chamber under pressure to deliver a flow of supersaturated water for ozonation of bulk liquid. The ozone is typically provided on-site with either an external generator or by a generator installed within the pressure vessel of the saturation tank. Thus, ozone is delivered to the bulk liquid through a controlled liquid stream that is saturated with a known and controlled amount of dissolved ozone. When the saturated ozone stream is released into the bulk liquid at ambient pressure, the ozone comes out of solution, forming microbubbles, and mixes with the bulk liquid. The amount of ozone in the saturated stream can be controlled by pressure and residence time in the saturation chamber (flow). Thus, using this technology it is possible to meter ozone to bulk liquids much more precisely, resulting in increased confidence of disinfection effectiveness. Off-gassing is greatly reduced because all of the ozone contained in the carrier water stream that is injected into the target water is dissolved. Ozone exiting solution does so as microbubbles, which quickly absorb into the target water, therefore, preventing off-gassing from bubbles exiting the water column through flotation. Also, since all the ozone produced is stored in a sealed tank until it is dissolved into the delivery water stream, no off-gassing occurs from the device.

Once the supersaturated water stream is injected into the water to be disinfected, the ozone is released in microbubble form. The microbubbles rise much more slowly through the water column than bubbles produced through typical aeration. Microbubbles also have a high surface area to volume ratio. This increased retention time and surface area coupled with precise dosage control allows nearly all ozone to be absorbed and deactivated within the treated water and minimizing release of ozone from the top of the water column. This reduces both the costs of generation and the hazards of operation. This aspect of the present invention can be scaled for in situ or industrial enhancement of any water quality processes that could benefit from controlled ozonation. This device allows for the ozonation of water and wastewater sites that may otherwise be too costly, such as small water/wastewater facilities, industrial facilities, groundwater remediation sites, and aquaculture facilities.

For this aspect of the invention, the aforementioned oxygenator is modified to dissolve ozone in water because of several unique constraints of ozone. Ozone can become explosive at 240 g ozone/$m^3$ air. Operation of the device will not allow ozone to exceed a concentration of 180 g ozone/$m^3$ air by limiting the pressure that can be formed in the saturation chamber. Ozone is corrosive to many substances and cannot be compressed with readily available gas compression equipment. Also, ozone is unstable and compression increases the tendency for $O_3$ to reduce to $O_2$. Therefore, ozone cannot be stored in compressed form for any extended period of time. These constraints require the operation of the ozonator to compress ozone immediately after it is generated and quickly dissolve the ozone into water. This can be accomplished through the following operational steps.

1. Ozone is produced from dry air at a concentration of 3%.
2. The initial condition of the saturator is full of water with all pumps off and outlet valve open. The slightly pressurized ozone forces the water out of the saturator until there is only a sufficient amount of water at the bottom of the saturator to prevent gas from directly exiting the saturator and passing through the orifice tube.
3. Once the ozone fills the saturator, the saturator outlet valve is closed and the ozone inlet valve is closed.
4. The water pumps are activated, thereby opening the check water inlet check valve allowing water to enter the spray nozzles and the saturator.
5. Water is pumped through the spray nozzles into the saturator until the water level rises sufficiently to compress the trapped ozonated gas to the desired pressure. The pressure reached is limited by the volume of the saturation tank so a working pressure of 35 psi is the maximum pressure attainable by using water to compress the ozone.
6. Once the desired ozone pressure is reached, the water pumps are turned off (or diverted to prevent excessive motor cycling) which closes the water inlet check valve to the saturator. The saturator outlet valve at the bottom of the saturation tank is then opened allowing the water containing dissolved ozone to exit the saturator to pass through the orifice tube(s) and create microbubbles to ozonate the target water to be treated.
7. The water/ozone solution is allowed to exit the saturator until the pressure of the ozonated gas in the headspace above the water decreases to the minimum desired pressure. The saturator outlet valve at the bottom of the tank is then closed and the water pump is re-activated to repressurize the system.
8. Ozone does not need to be added to the saturator until the concentration of ozone in the headspace is reduced below a critical level due either to dissolution in water or reduction in concentration by conversion to $O_2$. As the concentration of ozone in the gas headspace is reduced, the pressure of the headspace can be increased without danger of explosion. This allows the rate of ozone added to the treatment water to be held constant even though the saturator pressure and ozone concentration in the headspace are not constant.
9. Once ozone concentration in the gas headspace in the saturator is reduced below an effective level, the fill/empty cycle can be modified by pressurizing the saturator by pumping water into the saturator through the spray nozzles until the headspace is compressed to the maximum allowable pressure or the saturation chamber is filled with water. The water pumps are turned off and the outlet valve opened to release pressure to below that of the ozone generator outlet. Then the ozone entry valve is opened allowing ozone to refill the saturator and the fill/empty cycle is repeated.
10. To obtain near-constant delivery rates of water supersaturated with ozone several saturation chambers can be operated in parallel with a time offset.

The advantages of an ozonator according to the principles of the present invention compared with previous technology are summarized as follows:

1. The ozonator is compatible with current ozonation infrastructure, requiring minimal retrofitting.
2. The ozonator treats biologically-active water. It utilizes microbubbles that attach to particulates in the water to disinfect both suspended and flocculated pathogens.
3. The supersaturated water is released from an orifice tube that can be placed in any location within the depth of a water column. This controlled flow of ozone-saturated water can provide a curtain of disinfection wherever and whenever desired. No off-gassing occurs, so scrubbers may not be necessary, potentially reducing installation and operation costs and increasing safety.
4. The injection of water with a controlled direction and velocity provides for greatly enhanced dose and residence time control, critical elements for effective and efficient ozone disinfection.
5. The device adds only ozone and adds no other chemicals, catalysts, enzymes, or exogenous materials to the water being treated.
6. The device is scaleable so the rate of ozone added can be increased or decreased to account for highly varying bulk liquid volumes and particulate concentrations in the liquids being treated. This feature also allows the device to be operated based on input from a turbidity and ORP sensor set, allowing only the required amount of ozone be added at the required location automatically.
7. The device has a relatively low capital cost because no specialized or expensive equipment is involved.

The present invention is now described with reference to particular examples, which are presented to illustrate the invention, but do not limit it.

EXAMPLES

Example 1

Oxygenation with Air or Oxygen

A proof-of-concept system was constructed and preliminary "proof-of-concept" testing performed using a 1000-gallon capacity plastic tank filled with water containing varying levels of organic pollutants to simulate field conditions. The results of some of the preliminary tests performed are summarized hereinbelow.

Tap water with added sodium sulfite (an oxygen binder) was treated to raise DO from 1 mg/liter to 6 mg/l. Oxygenation rates measured were: bubble aeration 9.1 g oxygen/hr, oxygenator with air 22.7 g oxygen/hr, oxygenator with oxygen 113.6 g oxygen/hr. Energy to oxygenate the tank water using oxygen and the oxygenator was ⅙ that of bubble aeration. Weak animal lagoon water was added to the treatment tanks. Test results indicated the oxygenator was able to create a floating layer of algae, and supersaturated DO conditions were maintained throughout the test. The bubble aeration tank created turbulence that continually fractured the algae layer.

Food-processing waste was added to the tank. Indigenous microbes grew rapidly causing the wastewater to have a measured pretreatment DO near zero. The oxygenator was able to quickly increase DO to above saturation levels (7 mg/liter) and remove all objectionable odor very quickly.

The optimum operating parameters determined to maximize the ratio of oxygenation rate to power consumed in non-bioactive reduced DO tap water were first determined using the field-scale oxygenator (nominal water flow rate of 20 gallons per minute). When the maximum energy efficiency for the field-scale unit was determined to be the minimum nozzle size (1 nozzle) and maximum pressure (100 psi), the test was repeated using the lab scale oxygenator (nominal flow rate 2.7 gallons per minute) where a slightly higher pressure and smaller size nozzle could be used.

This experiment was conducted to determine the overall effect of saturation chamber pressure, and nozzle size on the efficiency of oxygen delivery in terms of rate of oxygen delivered per energy consumed (g oxygen per minute per kW electricity consumed). The higher the saturation tank pressure, the higher the partial pressure of oxygen in the gas (air) and the more oxygen that can be dissolved into the water in the saturation chamber. However, this increase in oxygen delivery is counteracted by an increase in energy cost since the pump must provide more work to deliver water to the saturator at a higher pressure. Also, as the size of the nozzle decreases, the backpressure against the pump increases, which results in higher pump energy consumption. However, as the nozzle size decreases, the water spray entering the saturation chamber is increasingly atomized and the percent oxygen saturation increases.

The field-scale oxygenator was set to deliver water into the saturator at pressures of 40, 60, 80, and 100 psi. The nozzles were arranged to be tested using 1, 2, 3, and 4 nozzles in parallel (in effect increasing the nozzle diameter and decreasing backpressure with more nozzles). Two tests at each setting were completed and all tests were conducted in random order blocked within number of nozzles (it is cumbersome to change nozzles). Compressed air was used as the gas. Water flow rates were measured as the oxygenator delivered microbubbles to deoxygenated water (using 300 grams sodium sulfite to reduce DO to less than 1.0 mg/L) in a 1000 gallon tank. Inlet water to the oxygenator was also deoxygenated so the only oxygen added to the system was from the oxygenator. DO and temperature were measured using 2 duplicate calibrated YSI-85 probes in the treatment tank. Each test was conducted over a time period of 15 to 30 minutes depending upon the water flow rate into the treatment tank. Tests were ended when water DO exceeded saturation at atmospheric conditions. Energy consumption was monitored by measuring electrical current and voltage for the pump.

Once all data was collected for tests, a first order equation was used to model the DO in the tank as a function of time. The model was useful to calculate the rate of oxygen delivered for all tests at reference conditions for water temperature and initial water DO, which were slightly different between tests. The first order equation is:

$$DO_{(any\ time)} = (DO_{initial} - DO_{final}) \exp(-k \ast time) + DO_{final} \quad (1)$$

The parameters of k (first order constant) and $DO_{final}$ were fitted to the data using a least squares error method. Average error of prediction was very small at 2%. DO readings were all converted to percent saturation at atmospheric pressure and then back to DO at a standardized temperature of 20° C. Also from this data, the rate of addition of oxygen is reduced with time as the DO of the tank increases and the gradient between DO of treatment water and DO of tank water decreases. This phenomenon does not likely occur during treatment of streams as the water being treated will remain at a constant, low DO since the process will be continuous flow. To represent this effect, the rate of oxygen added to the tank was computed using the first order model (equation 1) with k and $DO_{final}$ computed from each test assuming an initial DO of 1.0 and treating for 1 minute for all tests. Again, this was done to standardize comparisons. The total oxygen added over this minute was assumed to be the rate (g oxygen per minute) added to each tank.

Energy consumption was determined from the equation for energy delivered to the system, not energy actually consumed by the motor. This was done so comparisons can be made between systems of different scale using different pumps. The computation for energy delivered to the system does not include any inefficiencies incurred by the electrical motor. Motor efficiencies can vary widely and can greatly skew comparisons between oxygenators at different scales. For example, the field scale unit uses a centrifugal booster pump with motor with an efficiency of around 50%. The lab-scale oxygenator uses a piston displacement pump with a motor 20% efficient. If the rate of oxygen delivered per kW energy consumed by the motors were calculated, the field-scale unit may measure to be significantly better than the lab scale even if the number of nozzles and pressure settings result in exactly the same performance characteristics with the difference being because of the motor only. This problem can be solved by resizing the motor or changing the pump type, without changing the nozzle and pressure configuration.

The energy delivered by the oxygenator is given by:

$$E = \text{Backpressure on pump} \ast \text{Flow rate} \quad (2)$$

Figure 2:
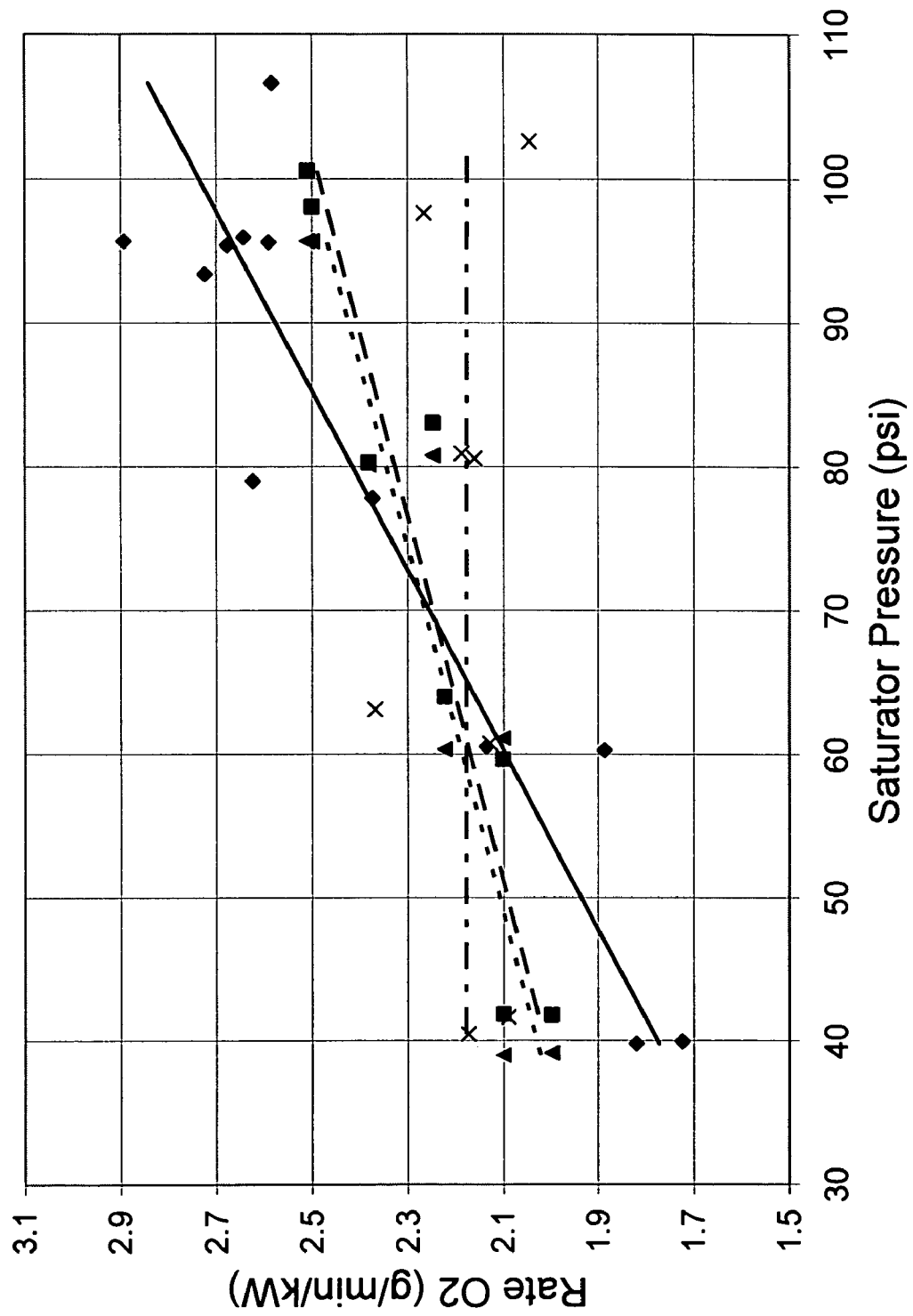
FIG. 2 shows the rate of $O_2$ added per energy (g/min/kW) delivered by a field scale unit as a function of spray nozzle size and pressure inside a saturation tank. Theoretical energy consumed is a measure of the energy required to deliver oxygen and is independent of motor efficiency. (solid line ♦=1 nozzle, long dash line ■=2 nozzles, short dash line ▲=3 nozzles, long dash short dash line X=4 nozzles).

Both of these parameters were measured during the tests and efficiency was determined by dividing standardized rate of oxygen delivered by energy delivered. Results are shown in FIG. 2.

The highest efficiency (near 2.7 g $O_2$ per kW) for the field-scale unit was obtained using the highest setting of saturator pressure (near 100 psi) with the fewest number of nozzles (one). This result indicates that if the nozzle size could be reduced and the tank pressure increased, efficiency may increase. The effect of nozzle size on the percent saturation of water in the saturation chamber was also analyzed using the data above. The nozzles used in the field-scale unit were TF full cone-type, 2F-20, 120° pattern, brass nozzle (BETE Fog Nozzle, Inc.) and the nozzles used in the lab-scale unit were wash jet-type, #25, 15° spray pattern (Spraying Systems Co.; Wheaton, Ill.). As nozzle size decreases, the water spray into the saturation chamber is increasingly atomized and backpressure behind the nozzle increases.

Figure 3:
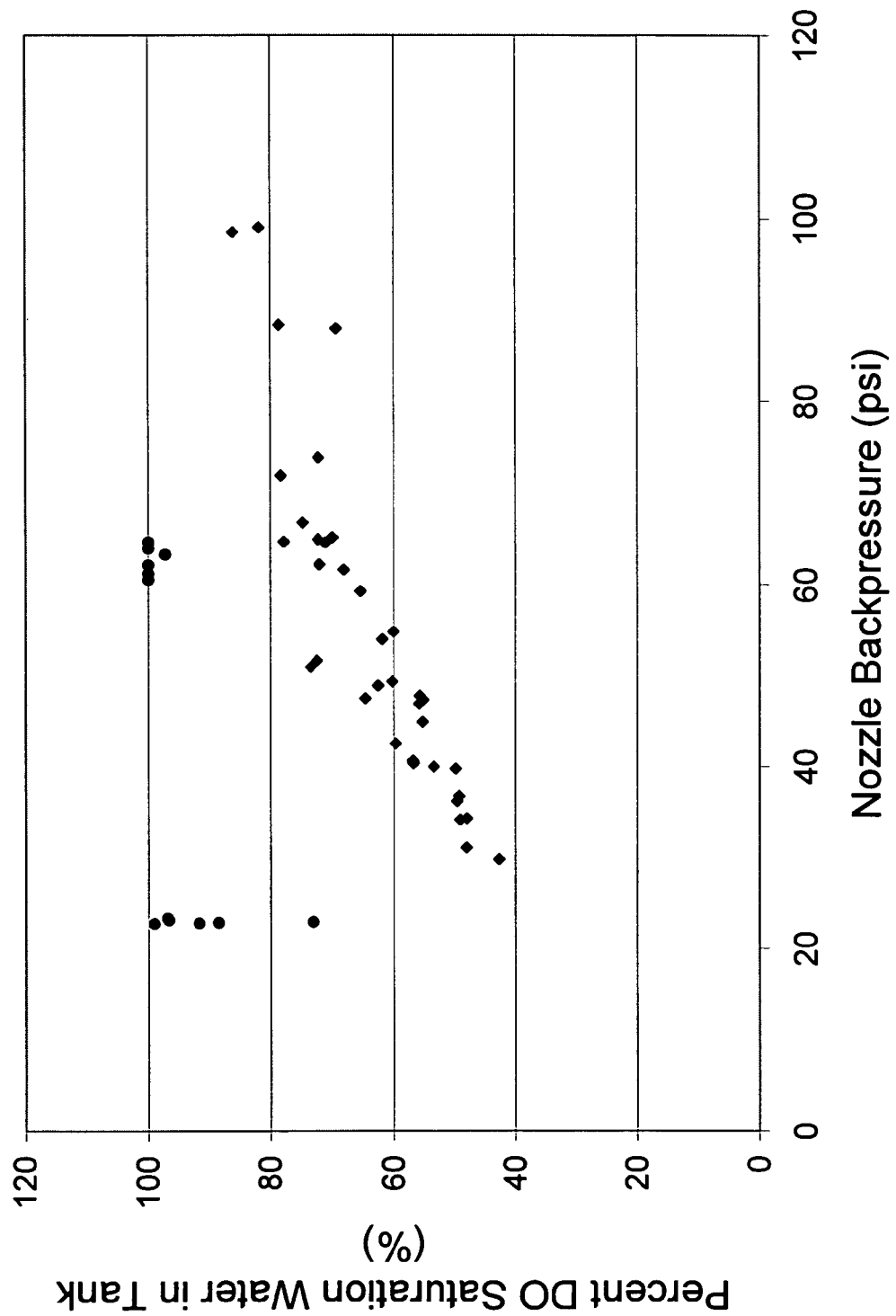
FIG. 3 shows the effect of backpressure due to nozzle type (♦=large nozzles from field-scale unit vs. ●=small nozzles from lab-scale unit on percent saturation of water in the saturation chamber. Water that is 100% saturated at the elevated pressure in the saturation chamber (at the pressure set point) would be supersaturated at atmospheric pressure.

FIG. 3 shows the effect of increased nozzle backpressure on the percent saturation of water in the saturation chamber. The saturation chamber pressure is held constant at the desired set point in these experiments. The smaller nozzles in the lab-scale unit were able to increase saturation efficiency to nearly 100% at some of the testing points. This indicates the type of nozzle used is important for optimizing the rate of gas dissolved in the liquid per power consumed. A suitable commercially available nozzle can be obtained from Spraying Systems Co. (Wheaton, Ill.).

The effect of saturation tank pressure on efficiency of oxygen delivery was explored for the two nozzle sizes in the lab-scale unit. It was possible to achieve higher saturation tank pressures with the lab-scale unit. Both nozzle sizes were able to achieve peak efficiencies close to 4.5 g $O_2$ per kW, which is a substantial increase over the field-scale unit with less optimal nozzles.

Example 2

Comparison of Oxygenator with Other Devices

A device of the present invention was compared to currently used technology for providing oxygen to wastewater. The most commonly used technologies are fine-bubble aeration provided through diffusers by blowers or compressors using atmospheric air (fine-bubble air) or compressed oxygen (fine-bubble oxygen).

Mixed Liquor was obtained from the Fayetteville, Ark. wastewater treatment plant. The wastewater was stored in a 550 gallon plastic tank until used in these tests. The mixed liquor quickly become anaerobic and remained so until testing. Each test began by transferring approximately 100 gallons of the mixed liquor into an open-top 1000 gallon tank. Then 700 gallons of reduced DO tap water (sodium sulfite was used to remove oxygen) was added. The wastewater solution was then mixed using a sump pump turned on its side. Two calibrated YSI-85 DO probes were placed into the wastewater and initial samples were collected at two hour intervals for Specific Oxygen Uptake Rate (SOUR), solids, and BOD5 (dissolved oxygen consumed in 5 days by biological processes). An oxygenator according to the present invention was operated at a saturation tank pressure of 110 psi with one small nozzle. The standard air and oxygen fine-bubble systems (obtained commercially from Sanitaire Corp. (Brown Deer, WS) were operated by providing compressed gas into a rubber diffuser that is commonly used in the wastewater aeration industry. The flow rates for standard bubble aeration were 15 L/min for oxygen and 34 L/min for air.

Figure 4:
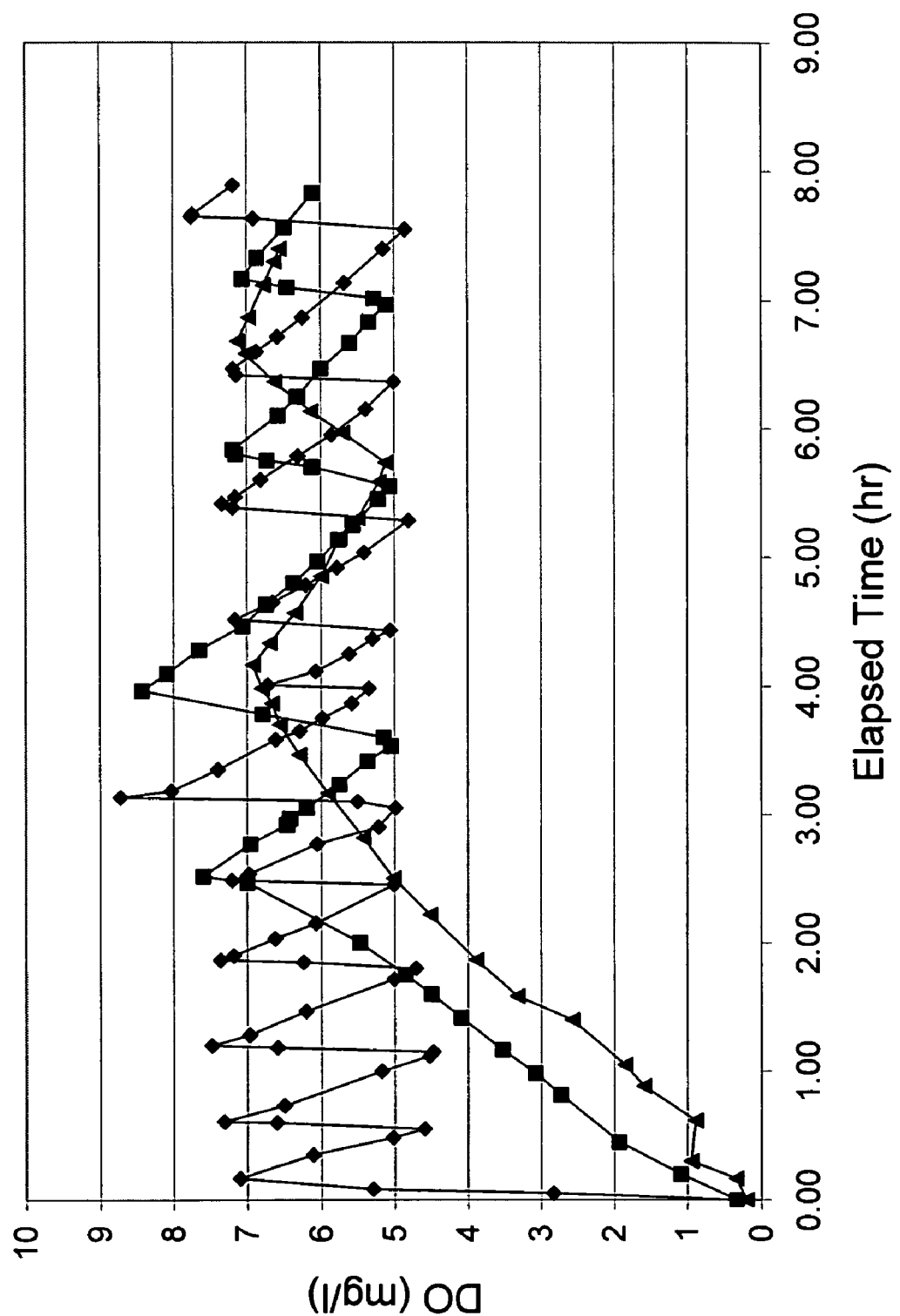
FIG. 4 depicts DO levels as a function of time for different operating regimens (♦=present invention: "Eco-Oxygenator"; ■=fine-bubble oxygen: oxygen bubbled into bottom of tank using typical diffuser; ▲=fine-bubble air: air bubbled into bottom of tank using typical diffuser. The Eco-Oxygenator quickly raised DO levels and each peak in its line shows that when the device is turned on the DO level rises quickly, which permits the device to be turned off for the majority of each hour.

The equipment tested (oxygenator, standard bubble aeration, standard bubble oxygenation) was operated until the DO in the tank reached 7.0 mg/l. At this point, the equipment was turned off and remained off until the DO dropped to 5.0 mg/l. This sequence of operation (FIG. 4) was continued for 8 hours and ensured that each piece of equipment need only be operated at its minimum duty cycle to provide adequate oxygen (5.0-7.0 mg/l) for biological treatment to occur.

Specific oxygen uptake rate (SOUR) and 5-day biochemical oxygen demand (BOD5) were measured during treatment of wastewater using standard methods (APHA, 1998). The results show that, as expected, if sufficient oxygen is provided, the biological processing to remove BOD will occur. SOUR is the rate of oxygen consumed per mass of volatile solids. Volatile solids indicate mass of bacteria and SOUR indicates the activity of the bacteria consuming the solids. Bacteria found in municipal wastewater treatment systems have been carefully evolved over time to provide the most efficient treatment of BOD. When the oxygen demand of these bacteria is met, they quickly reduce their consumption per mass. This data indicates a typical result when "stale" bacteria are used in a batch process (the bacteria are stale since they were stored for several days and allowed to become anaerobic). The BOD5 data indicates significant reduction has occurred in all three treatments and, as expected, by providing sufficient oxygen to the system, the desirable biological processes can occur. Based on the BOD data, the time to reduce the BOD in each tank was estimated by determining the amount of remaining BOD that needed to be removed after the 8 hour treatment and determining the rate of reduction of BOD for each treatment based on the 8 hour test. The time remaining was added onto the 8 hours for an estimate of the total time required. The data available to make these estimates is limited, so cost comparisons per 8 hour basis were also made.

The source of oxygen was a 4 foot compressed oxygen cylinder with a volume of approximately 42 liters. The source of air was a 4 foot compressed air cylinder. Since compressed gas cylinders were used, no source of electricity was required for the fine-bubble system. Oxygen and air from these cylinders is much more expensive than can be acquired for larger scale operations. Air in particular is much cheaper if a blower or compressor is used directly. However, the air flow rates required for this test were beyond the capability of any available and affordable compressor units and a cylinder was used. The costs for providing 34 L/min of compressed air with a 5 hp compressor can be estimated from US DOE, Industrial Technology Program Compressed Air Tip Sheet #1 (www.eere.energy.gov/industry/bestpractices). The costs of using this compressor on the test system are estimated below for a more reasonable comparison to fine-bubble air systems.

Cost data showed a large savings provided by an oxygenator of the present invention, with the treatment level provided at least equal to that of the other treatments. The estimated time to reduce BOD5 by 50% was slightly less for the present invention (lab scale) compared with standard bubble aeration. It is believed that alternative systems would be deemed feasible if a 15% to 40% reduction in cost were achieved. This objective was exceeded when the oxygenator was shown to achieve an 83% reduction in cost (see Table 1).

TABLE 1

Comparison of three $O_2$ delivery technologies by efficiency and cost.

| | Present Invention | Standard bubble aeration | Standard bubble oxygenation |
|---|---|---|---|
| $O_2$ delivery rate | 156 g $O_2$/hr | 6.4 g $O_2$/hr | 27 g $O_2$/hr |
| Rate of energy consumption | 0.956 kW | 3.7 kW (estimated for properly sized 5 hp blower) | 0.0 kW |
| Average Cost Oxygen or Air | $0.41/hr | $4.00/hr (air cylinder) | $1.96/hr (cylinder) |
| Actual Operating time of device over 8 hr test | 0.54 hr | 5.65 hr | 3.35 hr |
| Actual Cost to Oxygenate for 8 hrs (electricity $0.06/kW-hr) | $0.25 | $22.60 (cylinder) $1.27 (Estimated Blower) | $6.57 (cylinder) |
| Estimated Time to Reduce BOD by 50% based on Observed Rates | 16.5 hr | 19 hr | 30 hr |
| Estimated Cost to Reduce BOD by 50% | $0.52 | $53.68 cylinder $3.02 | $24.64 |
| Cost Savings % | — | 99% cylinder 83% estimated blower | 98% |

The present invention was compared to surface impeller and drop structure treatment. These are technologies often used to treat high strength wastes that would be typical of those generated at an animal production or food processing facility. A surface impeller is a device that agitates the surface of a pond or tank to increase the amount of oxygen from air dissolved into the wastewater through physical entrainment. A drop-structure uses the potential energy of flowing water to fall through air and create agitation at the surface which increases the surface area of wastewater exposed to ambient air and mixes in air via entrainment when the water drops through the surface. The agitator was ¾ horsepower rotating shaft with an impeller. The drop structure used a pump to circulate the wastewater to an elevation of 4 feet above the water surface at the drop point. The flow rate of the pump was 120 liters per minute. The present invention was used at a saturation tank pressure of 110 psi with one small nozzle.

The wastewater used for these tests was obtained from a hog house manure pit located at the University of Arkansas Swine Research Facility in Savoy. The liquid waste was stored in a 550 gallon plastic tank until used. The waste quickly become anaerobic and remained so until testing (16 days). Testing with each aeration technology began with setup of the equipment and instrumentation. Approximately 70 gallons of manure were added to 730 gallons of water in a 1000 gallon tank to provide a moderately high strength wastewater (BOD5 of about 750 mg/l). The wastewater had relatively high concentrations of ammonia (>120 mg/l) and phosphorus (>25 mg/l), but low concentrations of nitrate (<1.0 mg/l) at the start of testing. Aeration testing was conducted for 8 hours with frequent sampling of DO, BOD5, SOUR, temperature, and nutrients.

Figure 5:
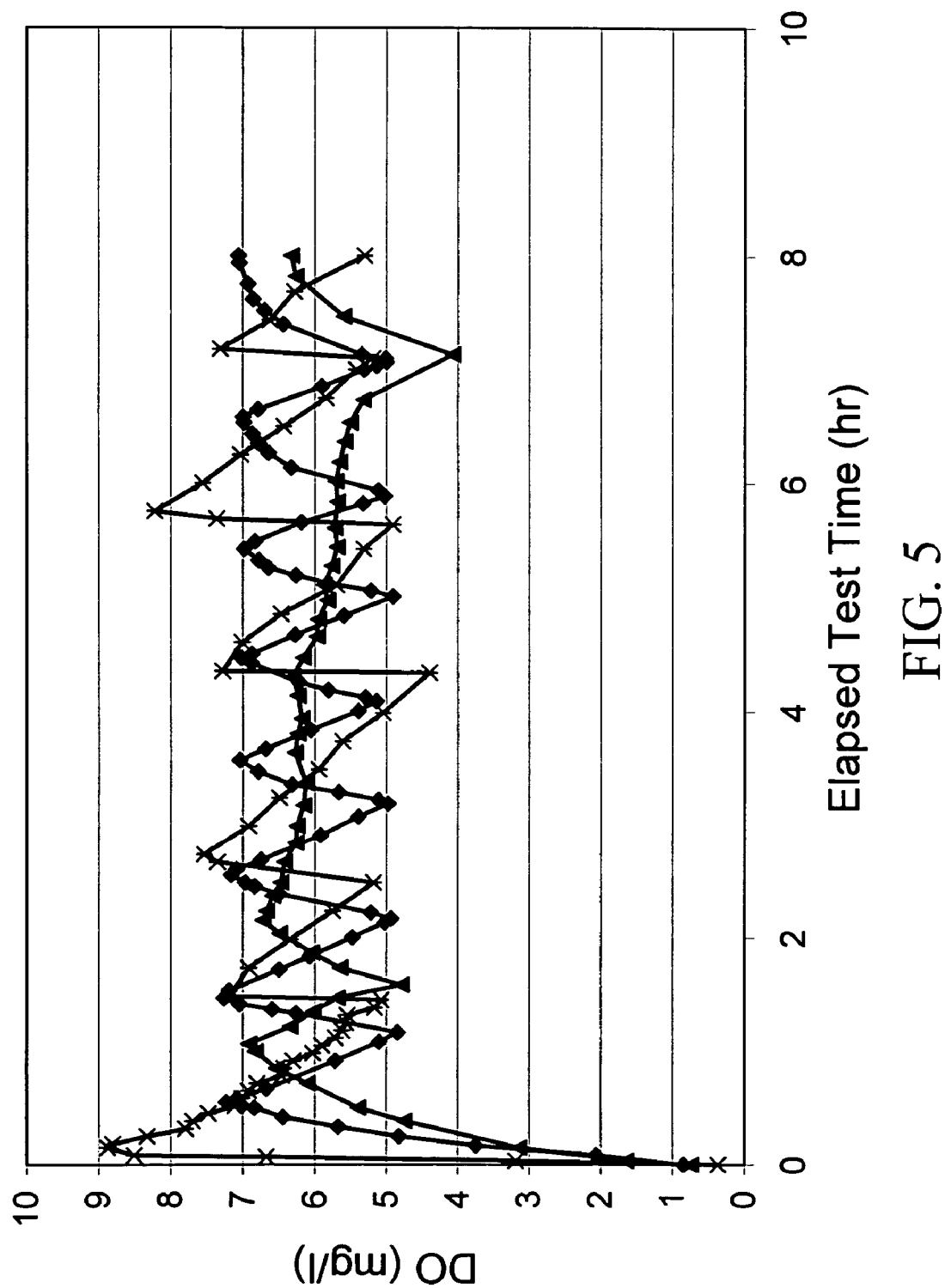
FIG. 5 illustrates relative DO levels vs. time for three technologies (X=present invention: "Eco-Oxygenator"; ▲=Agitator R1: typical surface agitation using submerged impeller with air entrainment; ▲=DropStruct R1: commonly used entrainment by pumping water to height above water surface and dropping water stream into surface, causing entrainment).

Calibrated DO probes (YSI-85) were placed into the water and testing began. The equipment was operated until the DO of the water reached 7 mg/L at which point the equipment was turned off. Operation began when the DO of the water dropped below 5 mg/L. Dissolved oxygen data are shown in FIG. 5. As occurred with the mixed liquor tests, an oxygenator according to the present invention was able to provide oxygen to the system much more rapidly than either surface agitation or the drop structure.

Samples for BOD5, SOUR, and solids were collected at elapsed times of 0, 0.25, 1, 2, 4, and 8 hrs. Each of these tests was replicated for a total of two tests using each technology. The BOD5 and SOUR data indicates that the swine waste was very strong wastewater and provided a stern test for the technologies. The BOD5 and SOUR data also indicate that typical biological treatment is occurring for all tests as these measures are decreasing, albeit slightly. These experiments were conducted outdoors and the wastewater temperatures were near 10° C., so biological processing of BOD was expected to be slow. The wastewater temperature between treatment tests was difficult to control, so temperature correction of all process rates to a normalized value at 20° C. was made using the method of Chapra (S. Chapra, 1997, *Surface Water-Quality Modeling*. WCB/McGraw-Hill, Boston, Mass.).

criteria established in objective 3 of 15-40% savings for success. These data contain much variation because of the variation in BOD in the raw wastewater. It is noted that the swine wastewater data show much more variation than the relatively processed and consistent mixed liquor.

TABLE 2

Rates of reduction of BOD from each treatment process

| Treatment | % Reduction BOD5 (%) | % Reduction SOUR (%) | Rate of Reduction BOD5 (%/hr) | Rate of Reduction SOUR (%/hr) | Est'd Time to Reduce BOD5 (hr)* |
|---|---|---|---|---|---|
| Agitation R1 | 4.0 | 4.17 | 0.5 | 0.521 | 72.8 |
| Agitation R2 | 15.4 | 2.25 | 1.9 | 0.281 | 17.9 |
| Drop Structure R1 | 0.8 | 1.57 | 0.19 | 0.197 | 190.0 |
| Drop Structure R2 | 9.2 | 4.58 | 1.1 | 0.573 | 33.1 |
| Eco-Oxygenator R1 | 7.4 | 2.50 | 0.9 | 0.312 | 37.7 |
| Eco-Oxygenator R2 | 15.2 | 3.92 | 1.9 | 0.490 | 15.3 |

*Estimated time to reduce BOD5 50% 20 deg C.

Ammonia (as ammonium), dissolved phosphorus, nitrate, and nitrite samples were collected at the end of each test. Nutrient dynamics across all treatments were as expected for bio-solids that were converting from anaerobic to aerobic respiration and growth processes (Table 3). Nitrites increased in each case, even doubling in the drop structure treatments, reflecting a probable oxygen limitation in the bacterially-mediated nitrification process that converts ammonia to nitrate. Nitrates decreased in four of the six trials, and each treatment process reduced ammonia by between 2 mg/L (2%) and 21 mg/L (13%). Phosphorus uptake was highest in the drop structure, and lowest in the oxygenator. Nutrient dynamics observed in treatment of this high strength waste reflect microbial uptake processes, and thus are rather variable, given the size of the test system. The oxygenator does not appear to reduce these pollutants any more effectively than other technologies. However, it is clear that the oxygenator aeration system was approximately as effective at supporting microbial dynamics as the conventional treatment systems.

TABLE 3

Summary of nutrient reductions in two replications of each treatment.

Nutrient Reductions (mg/l/%) by Aeration Processes

| Parameter | Oxygenator Rep 1 | Oxygenator Rep 2 | Agitation Rep 1 | Agitation Rep 2 | Drop Structure Rep 1 | Drop Structure Rep 2 |
|---|---|---|---|---|---|---|
| $NO_2$—N (Nitrite) | 0/0 | −0.05/−41 | −0.05/−67 | −0.02/−23 | −0.07/−115 | −0.06/−100 |
| $NO_3$—N (Nitrate) | 0.06/11 | 0.02/5.1 | 0.12/25 | 0/0 | −0.05/−12 | 0.06/12 |
| $NH_4$—N (Ammonium) | 10.2/4.4 | 10.4/8.3 | 2.13/1.8 | 3.44/2.6 | 21.3/13 | 8.70/5.7 |
| $PO_4$—P (Dissolved Phosphorus) | −0.28/−1.0 | 0.09/0.4 | 2.39/8.6 | 1.57/5.7 | 4.99/17 | 3.36/13 |

(note (−) means increase in nutrient)

Time to reduce BOD5 by 50% was estimated from the test data. BOD removal rates were standardized to 20° C. for computation of total treatment times in Table 2. The oxygenator data indicated an average time savings of removing 50% of BOD of 38.9% under surface agitation and 19.9% under drop structure treatment. These savings meet the Treatment costs were compared and, again, the oxygenator showed a substantial cost savings. When actual costs were compared for conducting the 8 hour tests, substantial costs savings were computed. Operating costs and time to reduce BOD5 by 50% are shown in Table 4 hereinbelow.

Example 3

Field Deployment

The field-scale oxygenator was deployed at two locations in Northwest Arkansas: Mud Creek and Columbia Hollow Creek. Measurable increases in DO were measured at both locations. The deployment at Columbia Hollow Creek also demonstrated substantial reductions in BOD5 and ammonia levels. The ability to float suspended solids for subsequent removal by skimming was also demonstrated at this location.

The initial deployment was conducted in Mud Creek in Fayetteville, Ark. at a point just before the confluence of Mud and Clear Creek. A majority of water in this stream under base-flow conditions is effluent from the Fayetteville Wastewater Treatment Plant. During rainfall events, most of the flow is urban runoff from the City of Fayetteville. This stream is clean with a low BOD and acceptable DO.

TABLE 4

Comparison of three aeration technologies in terms of time and cost

|  | Present Invention | | Surface Agitation | | Drop Structure | |
| --- | --- | --- | --- | --- | --- | --- |
|  | Rep 1 | Rep 2 | Rep 1 | Rep 2 | Rep 1 | Rep 2 |
| $O_2$ delivery rate (g O2/hr) | 184 | 101 | 21 | 13 | 13 | 16 |
| Power (kW) | 1.08 | 0.965 | 0.589 | 0.583 | 1.089 | 1.085 |
| Average Cost Oxygen or Air ($/hr) @ $0.00218/liter | 0.48 | 0.26 | — | — | — | — |
| Operating time over 8 hr test | 0.173 | 0.168 | 3.97 | 4.125 | 7.43 | 5.083 |
| Total Cost ($) (electricity $0.06/kW-hr) | 0.0943 | 0.0534 | 0.14 | 0.144 | 0.485 | 0.331 |
| Ave Actual Cost Savings (%) | — | — | 74.0 | | 81.9 | |
| Estimated Time to Reduce BOD 50% (20° C.) | 37.7 | 15.3 | 72.8 | 17.9 | 190 (not used) | 33.1 |
| Ave Time Savings of Eco-Oxygenator (%) |  | — |  | 38.9 | 19.9 (rep 2 only) | |

The oxygenator was installed on the stream bank and the orifice tube placed in a deep pool (depth of 2 feet) within the stream. Mud Creek had a flow rate of 9 cubic feet per second measured prior to deployment. This flow rate varied greatly as several rainfall events occurred during deployment. Since the watershed is urban and mostly paved, the stream flow rate can change very quickly during rain.

The In Situ TROLL 9000 (Fort Collins, Colo.) datasondes were anchored to the streambed at 4 locations: just upstream from the orifice tube, 30 yards downstream, 120 yards downstream, ¼ mile downstream. The datasondes were calibrated in the lab prior to deployment and programmed to monitor DO, temperature, and water depth. Oxygen cylinders were used to supply the gas. Saturation tank operating pressure was limited to 80 psi because of vortexing problems. Two nozzles were used (this practice deployment was done prior to completion of the optimization tests). The oxygen injected into the stream was clearly visible surrounding the orifice tube.

Once proper operation of the unit was established, the stream was oxygenated over a period of 37 hours before a large rainfall event (at 87.5 hours) occurred and flooded the stream (stream depth rose 4 feet). The control site upstream from deployment and 120 yard site datasondes were recovered and the results are shown in FIG. 10. From this data, an average increase in DO content of the stream of 1.14 mg/l at the 120 yard site was realized. The oxygenator was not operated continuously during the 37 hours as oxygen cylinders needed to be manually changed as they emptied. The 120 yard site DO is consistently higher than the control site. The time lag between the two sites has been removed so that the DO values indicated represent approximately the same water. The lag time was established by average stream flow velocity and knowing the distance between the sites.

Over the 37 hour test period, the rate of oxygen used from the cylinder was approximately 27.7 g/min. If it is assumed that all this oxygen is added to the stream and the stream flow rate is assumed to be around 10 cubic feet per second (or 16,990 liters/min), then the rate of oxygen added should increase water DO by 1.6 mg/liter. The actual increase was less than this value (1.14 mg/L). This result seems reasonable since some oxygen would have been consumed by biological oxygen demand within the stream. Costs of operation for oxygenating the stream in this test were $120 for oxygen, and $130 for gasoline for generators for a total of $250. The rate of cost was $0.0038 per gram oxygen delivered. As a comparison, the cost of operating the lab-scale unit is similar at $0.00296 per gram.

The second field deployment was conducted at Columbia Hollow Creek in Benton County, Ark. This stream is highly impacted with organic wastes and possesses a significant BOD. The stream was sampled for water quality parameters including BOD5, DO, ammonia (indicated by ammonium), nitrate, nitrite, and soluble phosphorus. In Situ Model 9000 Datasondes were placed at 4 sites in the stream: site 1 was upstream of the oxygenator deployment site; site 2 was 100 feet downstream from the oxygenation site; site 3 was 1000 feet downstream from the oxygenation site; and site 4 was 2000 feet downstream. Datasondes collected DO and water temperature for 3 full days prior to oxygenator deployment (Aug. 12-14, 2004) to gather baseline data. The average baseline DO content was 5.35 mg/l at site 1, 4.48 mg/l at site 2, 3.45 mg/l at site 3, and 2.67 mg/l at site 4.

After the 3 day baseline measurements were collected, the datasondes were removed from the stream, recalibrated, and redeployed into the stream. During the redeployment, the datasonde located at site 2 was broken and unusable for further data collection. Oxygen concentration was manually measured (using a YSI-85 DO probe) at Site 2 periodically throughout the rest of the experiments. The oxygenator was activated and operated for 7 hours (noon-7 pm) at full capacity; this is referred to as treatment 1. The second oxygenation (treatment 2) was conducted on day 2 for 6 hours. Oxygenation was conducted for 6 hours on day 3 (treatment 3) and 8 hours on day 4 (treatment 4).

The oxygen mass balance of the stream system is extremely complex and can only be roughly estimated. Oxygen is added to the stream from ambient air and algae photosynthesis and removed by respiration processes by living matter in the water and sediment. The assumptions made to estimate the increase in DO from deployment of the oxygenator are grossly simplified, but do provide useful information. The change in oxygen concentration in stream water because of oxygenation can be estimated by subtracting the DO at the site in question from the upstream site for data collected prior to oxygenation. This is referred to as the baseline difference. If the baseline difference is subtracted from the average DO value at the upstream site during the oxygenator treatment, this result should estimate the DO of the site in question if there were no oxygen added. The difference between this result and the actually measured DO then estimates the increase in DO from the oxygenator. The DO at site 2 was measured manually using a YSI-85 meter. Manual readings were not collected during treatments 1 and 2. The data are shown in Table 5.

TABLE 5

Estimated increase in DO (mg/L) from Oxygenator treatment

| | Increase in DO (mg/L) by Treatment | | | |
|---|---|---|---|---|
| | Treatment 1 | Treatment 2 | Treatment 3 | Treatment 4 |
| Site 2 (100 ft) | — | — | 2.43 | 3.07 |
| Site 3 (1000 ft) | 1.22 | 0.62 | 0.84 | 1.27 |
| Site 4 (2000 ft) | 0.49 | 1.23 | 1.11 | 0.73 |

In addition to measuring an increase in DO from oxygen added by the oxygenator, a reduction in BOD5 is also indicative of an improvement of the health of a stream. The average oxygen uptake rate measured for the water in Columbia Hollow Creek prior to deployment was 4.43 mg oxygen per liter per day (similar to a BOD5 of 22.2, which is quite high). This stream had a high level of stored oxygen consumptive capacity and it was assumed that a portion of the added oxygen would be quickly consumed. Therefore, BOD5 comparisons were made between site 1 (the control site upstream from deployment) and site 2 (100 ft downstream from deployment). Prior to deployment during the four treatment days the average natural variation in BOD5 was a decrease of 0.25 mg/L between site 1 and 2. During deployment, the reduction in BOD5 between the control site and site 2 100 ft. downstream from deployment was an average of 10.1 mg/L for the four treatments for an average estimated reduction in BOD5 of 9.85 mg/liters. Therefore, this data indicates that part of the oxygen provided by the oxygenator initiated a substantial reduction in BOD5.

Nutrient data was collected at each site, and because of the wide variance in ammonia, nitrate, nitrite, and phosphorus in the effluent, it was difficult to discern the effect of oxygenation on these pollutants. However, a 50% reduction in ammonia ($NH_4$) levels during oxygenation was measured between site 1 (the control site upstream from deployment) and site 2 (110 ft downstream from deployment). This reduction was not observed in the baseline data before or one week after treatment. It can be theorized that this reduction in ammonia levels was due to rapid oxidation in the presence of dissolved oxygen. Other observations from these deployments were that the oxygen microbubbles provided flotation of what appeared to be sludge from the stream. This feature would allow for the removal of suspended solids by skimming.

In summary, an oxygenator according to the present invention was able to provide oxygen to the highly impaired Columbia Hollow Creek and measurements indicate an increase in the DO content, a decrease in BOD5, a reduction in ammonia levels and flotation of suspended solids.

The present invention has been described hereinabove with reference to certain examples for purposes of clarity and understanding. It should be appreciated by the skilled practitioner that certain modifications and improvements to the invention can be practiced within the scope of the appended claims and equivalents thereof.

What is claimed is:

1. A method of dissolving a gas in a liquid comprising:
   (a) pressurizing an enclosed vessel with the gas, wherein the gas enters the vessel at near ambient pressure and is pressurized via a closed system injection of liquid until a desired higher pressure is attained therein;
   (b) spraying a first portion of the liquid into the vessel containing the gas under conditions effective to dissolve the gas in the liquid;
   (c) passing the first portion of liquid containing dissolved gas from the vessel into a chamber that is provided with a plurality of orifices and which is immersed in a second portion of the liquid; and
   (d) discharging the first liquid portion containing dissolved gas through the chamber orifices into the second liquid portion.

2. The method of claim 1, wherein said pressurizing is conducted with a gas selected from the group consisting of air, oxygen, ozone, hydrogen, nitrogen, nitrous oxide, and carbon dioxide.

3. The method of claim 1, wherein said spraying is performed with a liquid primarily, comprising water.

4. The method of claim 1, wherein said spraying is performed until the first portion of liquid is dissolved with gas to 95% of saturation at the enclosed vessel pressure.

5. The method of claim 1, wherein the gas is separated on-site from ambient air prior to being pressurized into the vessel.

6. The method of claim 1, wherein said pressurizing is conducted with ozone gas.

7. The method of claim 1, wherein the gas is provided by on-site generation.

8. The method of claim 1, wherein the liquid is provided by a water tap located in a residence or industrial site and liquid is transferred into the vessel under tap pressure.

9. The method of claim 1, which is performed in continuous mode.

10. The method of claim 1, wherein the liquid is sprayed into the vessel under pressure provided by a high pressure liquid pump.

11. The method of claim 1, wherein fluid flow into the vessel from a high pressure pump is controlled via feedback from sensors indicating water capacity within the saturation tank.

12. The method of claim 1, wherein said discharging of liquid containing dissolved gas is effective to: (i) enhance microbe growth and respiration rate in waste water treatment, fermentation processes, food synthesis and manufacturing, or solid waste treatment; (ii) promote physical flotation of matter suspended in the liquid; (iii) quench anaerobic biological activity in the liquid; (iv) produce nanobubbles (10-100 nm diameter); (v) foam a polymer; (vi) create a biorefuge for attracting or sustaining fish populations; (vii) sterilize a body of water; (viii) facilitate surface freezing while aerating/oxygenating during cold weather; (ix) to control odor, antibiotic residuals, and/or bacterial loads in sewage transport conduits; (x) improve the quality of water entering, transducing, or exiting a dam; (xi) improving aerobic digestion efficiency and/or odor control in a wastewater treatment pond (lagoon); (xii) respond to a pollutant spill into an environmental water body; (xiii) isolate and/or treat a plume of pollution; (xiv) disinfect and reduce organic carbon in drinking water; (xv) control aerobic and anaerobic conditions in biological processes associated with pharmaceuticals and biotechnology; (xvi) deliver hydrogen or other gases to create and control aerobic and anaerobic conditions in biological processes associated with in situ waste treatment in groundwater; (xvii) deliver hydrogen or other gases to create and control aerobic and anaerobic conditions in biological processes associated with in situ waste treatment in surface waters; (xviii) deliver a high concentration of dissolved oxygen to enhance biological oxidation of organic carbon and nitrogen removal within wastewater treatment facilities; (xix) oxidize sediment in situ for enhanced bioremediation of contaminants sorbed to and associated with river, lake, and estuarine sediments; (xx) enhance oxygen treatment of refractory pollutants such as antibiotic residuals, endocrine disruptors, pesticides, and similar chemicals; (xxi) enhance ozone treatment of refractory pollutants such as antibiotic residuals, endocrine disruptors, pesticides, and similar chemicals; (xxii) inject supersaturated stream of oxygen, ozone, hydrogen or other gases for direct treatment or enhancing treatment of groundwater to remove pollutants; (xxiii) increase the rate of BOD removal because of improved treatment rate from smaller bubble size; or (xxiv) increase the thickness of the aerobic layer in sediment for increase storage capacity of phosphorus or other water pollutants.

* * * * *